United States Patent [19]

Sinjeokov Andriewsky

[11] Patent Number: 4,650,016
[45] Date of Patent: Mar. 17, 1987

[54] AUTOMATIC WEIGHING MACHINE WITH MINIMIZED ANGLE ERROR AND MOMENT ERROR

[76] Inventor: Miguel Sinjeokov Andriewsky, 3601 Sucre Str., Buenos Aires 1430, Argentina

[21] Appl. No.: 701,937

[22] Filed: Feb. 15, 1985

Related U.S. Application Data

[63] Continuation-in-part of Ser. No. 534,345, Sep. 21, 1983, abandoned.

[30] Foreign Application Priority Data

Apr. 28, 1983 [AR] Argentina .............................. 292845
Sep. 17, 1984 [AR] Argentina .............................. 297976

[51] Int. Cl.[4] .......................... G01G 3/14; G01L 1/22
[52] U.S. Cl. .............................. 177/211; 177/DIG. 9; 73/862.65
[58] Field of Search ................. 177/211, 256, DIG. 9; 73/862.65

[56] References Cited

U.S. PATENT DOCUMENTS

| | | | |
|---|---|---|---|
| 2,849,260 | 8/1958 | Rikken .......................... | 177/DIG. 9 |
| 2,899,191 | 8/1959 | Hunt ............................. | 177/211 |
| 3,938,603 | 2/1976 | Shoberg et al. ................ | 177/211 |
| 4,456,085 | 6/1984 | Boyles .......................... | 177/DIG. 9 |
| 4,457,385 | 7/1984 | Provi ............................. | 177/256 |

FOREIGN PATENT DOCUMENTS 216822 1/1980 Argentina .

*Primary Examiner*—George H. Miller, Jr.
*Attorney, Agent, or Firm*—Ladas & Parry

[57] ABSTRACT

A weighing machine where a load generates proportional bending moments in a pair of parallel beams having strain-gauges. Resolution is greatly increased by shaping each end of the beams so that the points thereof where load and reactive forces are applied lie in a single horizontal plane. Thus, firstly, the separation between the load and reaction application points, at each beam end, which influences the weight-to-strain transfer function, is far less dependent on beam deflection, and, secondly, the error moments due to the inevitable horizontal forces are greatly minimized. Preferably, the application points form coupling edges in contact with a planar face of respective coupling members, thus assisting in maintaining said separation constant. When long beams are specified, their central portion is rigidized to avoid error magnification brought about by excessive beam deflection, and the strain-gauges are symmetrically connected at flexible portions near the ends thereof, to obtain a reading independent of load eccentricity.

17 Claims, 21 Drawing Figures

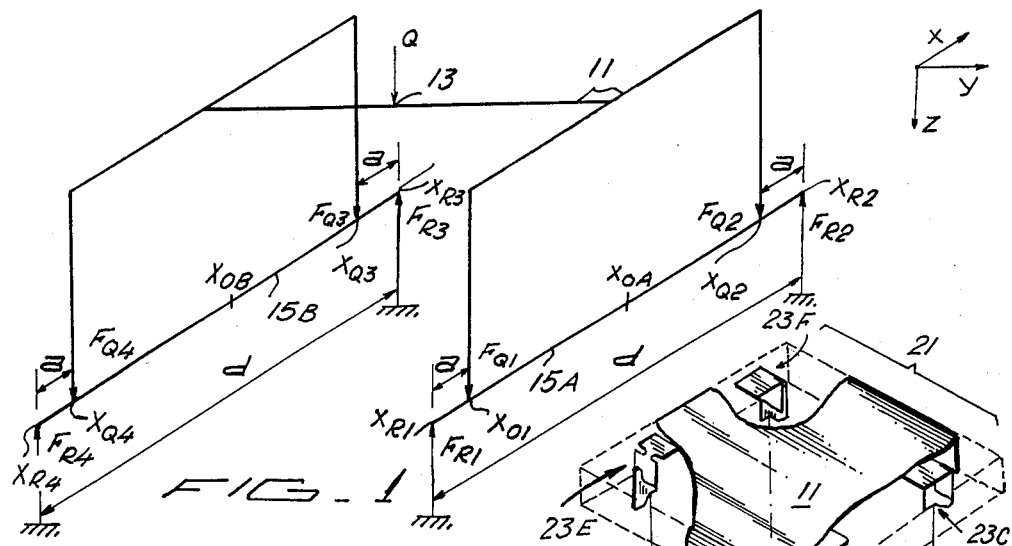
FIG_1
FIG_2
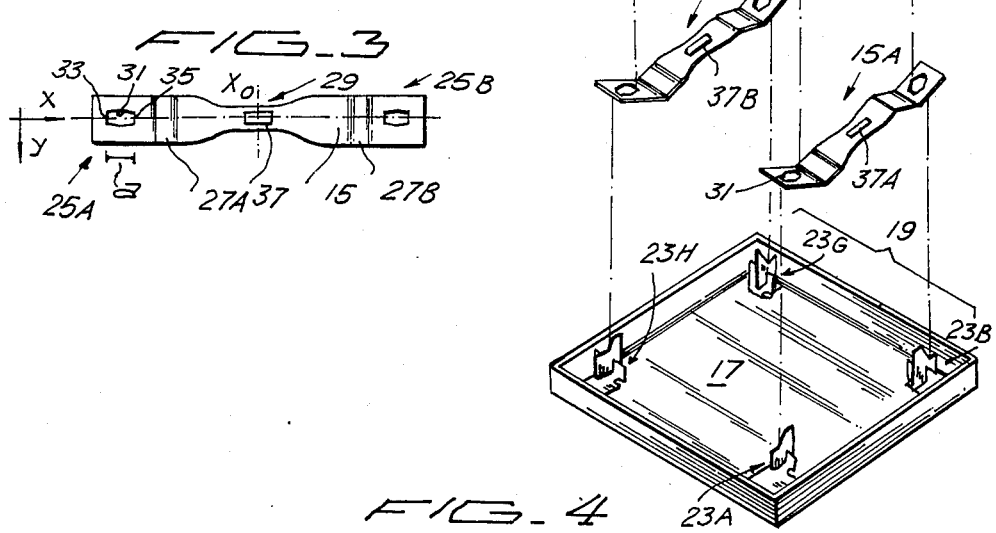
FIG_3
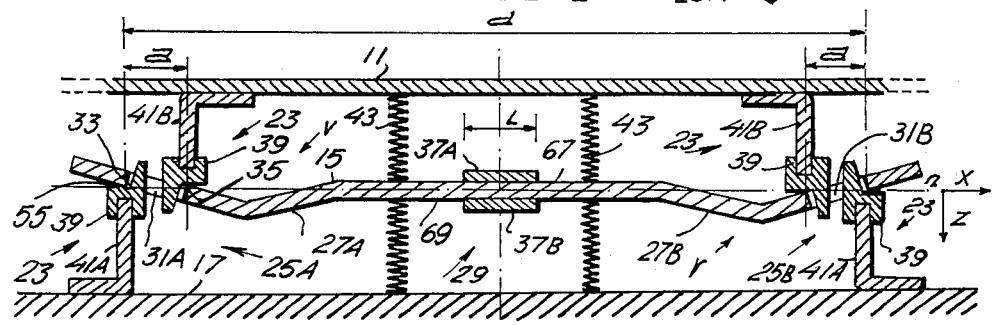
FIG_4

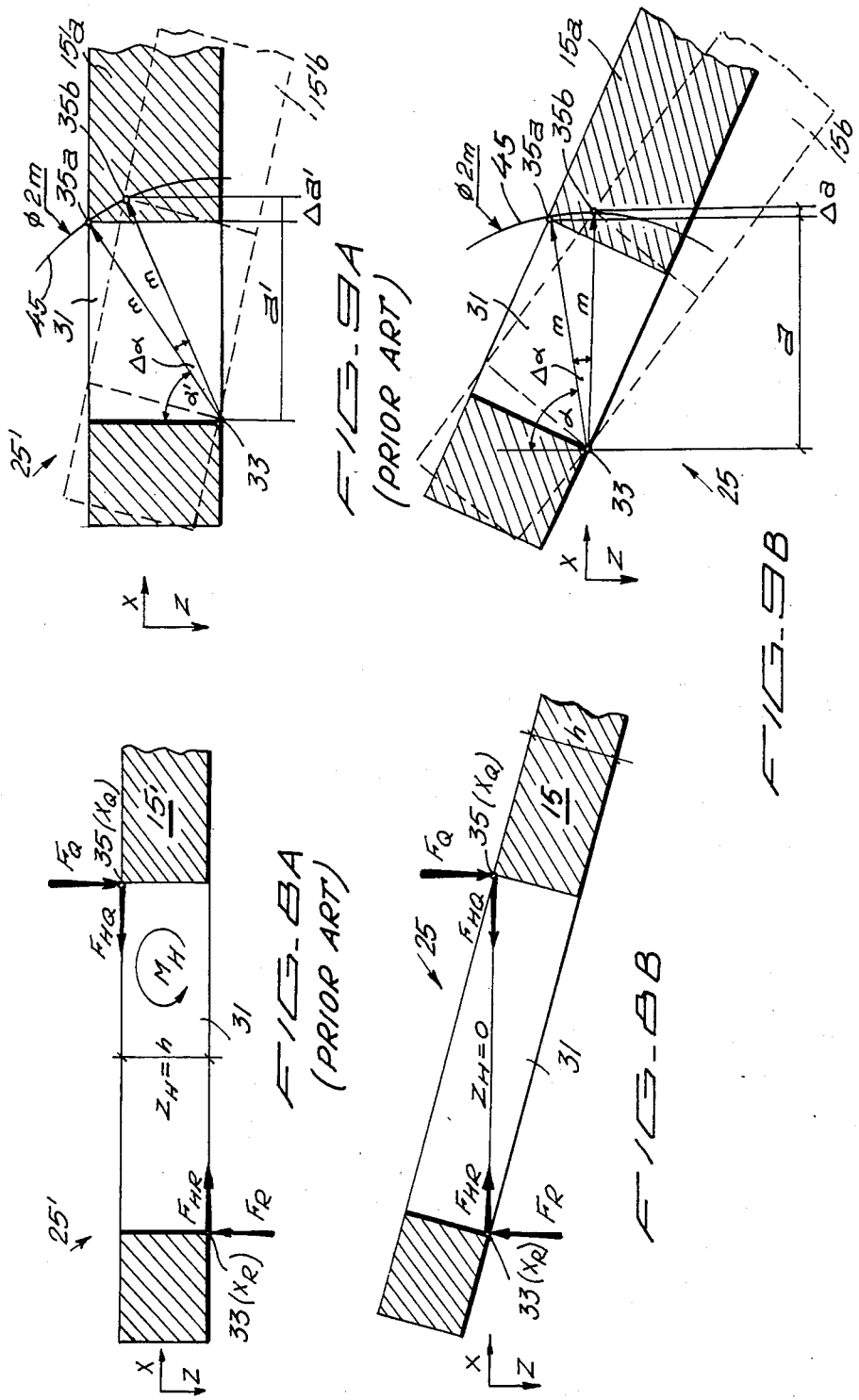

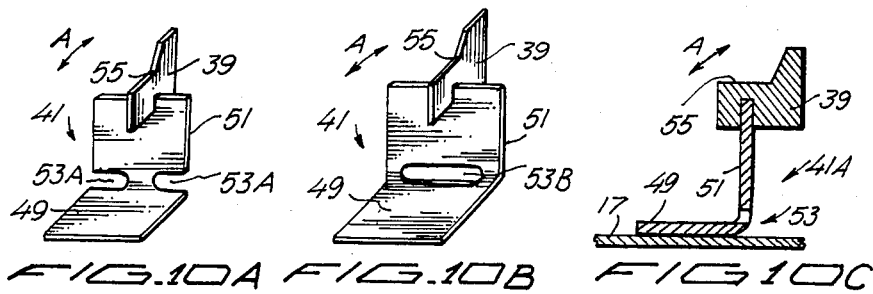
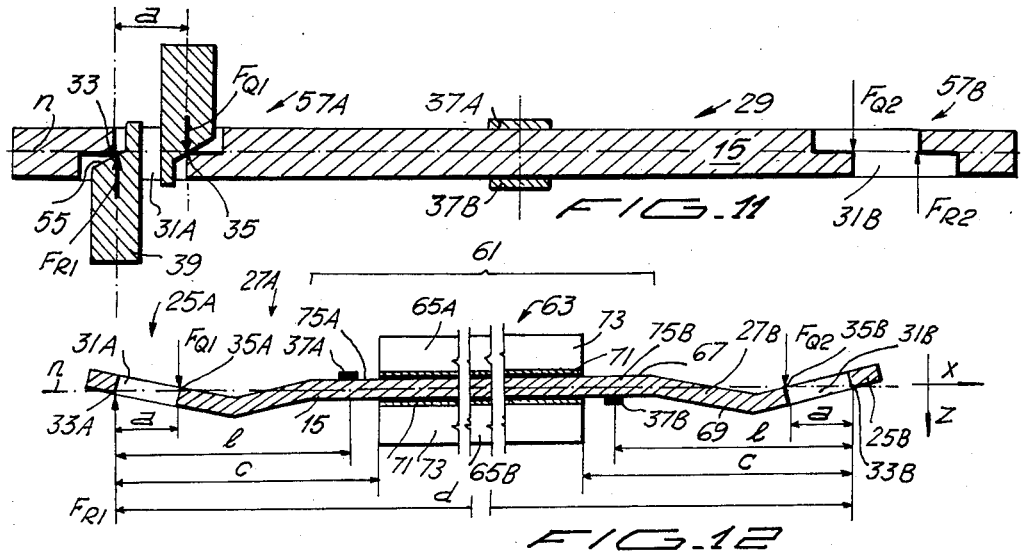
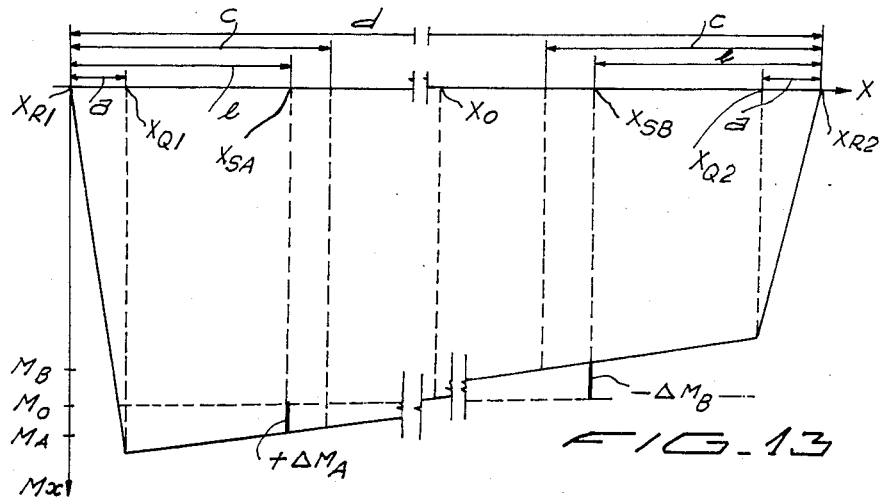

AUTOMATIC WEIGHING MACHINE WITH MINIMIZED ANGLE ERROR AND MOMENT ERROR

This is a continuation-in-part of co-pending application U.S. Ser. No. 534,345 filed on Sept. 21, 1983, now abandoned.

BACKGROUND OF THE INVENTION

1. Field of the Invention

The present invention is related to dynamometer machines and particularly to improvements in automatic weighing machines, wherein the load to be weighed is placed on a platform of the weighing machine, and a weight indication or reading independent of the load's relative position may be obtained. The present invention is particularly related to automatic weighing machines, i.e. those of the dynamometer type giving a read-out automatically upon a load being placed on their platform.

The type of weighing machine referred to herein, generally comprises a pair of side-by-side symmetrical beams lodged between a frame and a tray or platform, the latter being adapted to receive and support different weight loads. The beams are held in place at each end portion thereof by pairs of essentially vertical coupling members connected to transverse load the beam at each end portion in response to a weight load on the platform; which pairs of coupling members comprise, connected to each end portion of each beam, one member supporting the platform to transmit a load force, and another member similarly resting on the frame to transmit a reactive force dependent on load parameters. These load parameters are weight magnitude and eccentricity; the latter is defined by the position of the load in relation to the platform. The transverse loading of the beams creates bending moments at a middle portion thereof due to the longitudinal offset between the respective coupling points where the coupling members apply the load and the reactive forces to each end portion of the beams.

2. Description of the Prior Art

It is already known in the art that an accurate weight read-out may be obtained regardless of the relative position of the load on the platform of a weighing machine, i.e. even when the eccentricity of the point of application of the resultant force applied by the load on the platform is great. U.S. Pat. No. 2,899,191 explains that the sum of the bending moments at the longitudinal centre of each beam may vary only according to the magnitude of the weight, and is independent of the eccentricity of the load on the receiving platform. The centre of each symmetrical beam may thus be considered an invariant sensing position insofar the relative position of the load. Strain-gauges are attached to the beam at its invariant centre position, to detect the bending moment thereat. Argentine Pat. No. 216,822 shows means coupling the straight flat beams between the platform and the frame, adequate for transverse loading the beams without substantially subjecting them to other deforming moments.

In these types of weighing machines, the transfer function relating the weight of the load with the bending moment at the centre of each beam depends on geometrical factors which are generally assumed to be constant, such as the longitudinal component of the distance between the point supporting the platform and the point resting on the frame, at each end of the beam. In this sense, Argentine Pat. No. 216,822 also shows how a weighing machine may be manufactured, in which this distance is uniquely determined by the geometry of the beams. However, for different flexures of the beams, both these points move unequal trajectories, resulting in that said transfer function varies under different load conditions, giving rise to a so-called angle error which limits the precision of the machine.

Another source of error arises from the effect of horizontal forces, which are evidently disturbing, because weight is an inherently vertical vector parameter. Thus, any bending moment components due to non-vertical forces (i.e. horizontal force components) evidently introduce errors in the overall weight measurement. As explained more fully hereinafter, horizontal forces are originated by various sources: (a) inclination of the forces transmitted by the coupling members to the beams, with respect to the vertical direction; (b) friction between the beams and the coupling members during flexure, because of relative longitudinal movement between these means; and (c) elasticity of the coupling members as they yield under load. Due to the finite thickness of the beams, these horizontal forces are vertically offset and consequently contribute an error factor to the final bending moment at the centre of each beam. This is called the bending moment error. For all these reasons, the resolution of this type of prior art machine is limited to less than 1:1,000.

In large weighing machines, all these deficiencies are further magnified, because of the greater deflection of the centre of longer beams.

SUMMARY OF THE INVENTION

An object of the present invention is to improve the precision and resolution of the above mentioned type of weighing machine.

Another object of invention is to minimize the variation of the transfer function with the load, in particular due to angle error.

Another object of the present invention is to reduce the moment error caused by the inevitable horizontal forces.

A further object of the present invention is to reduce the displacement of the beam centre, without substantially affecting sensitivity, in the weighing machines needing relatively long beams.

These and other objects are attained with the weighing machine of the present invention, in which each beam is shaped so that all the coupling points or edges lie in a single horizontal plane, at least for a desired load condition. Preferably, this plane also contains the neutral axis of the middle portion of the corresponding beam.

Consequently, a first main feature of the invention is that the variations of the respective positions of the coupling points are practically vertical, and the longitudinal component of the distance between corresponding pairs of coupling points practically coincides with the distance itself. This all but eliminates any variation of the previously considered factor in the weight-to-strain transfer function.

A second main feature of this invention is that the vertical offset between the horizontal forces acting on the beam are minimized, without reducing beam thickness, practically eliminating the error moment contribution, i.e. the moment error in the bending moment magnitude at the centre of the beam.

This invention also teaches that the best way of obtaining coplanar coupling points, is by permanently inclining the end portions of the beam, so that all the coupling edges are at the same level. Preferably, each beam is shaped so that every intermediate portion respectively between each end and middle portions of the beam is permanently bent one way, away from the horizontal, i.e. either downwards or upwards, and the adjacent end portion is bent the other way in respect to the horizontal. Thus, the intermediate and end portions form each side of an open V.

According to another feature of the invention, the coupling points integral with each beam form straight horizontal transverse edges for direct contact with a horizontal face of a corresponding member, each of which couples a beam to either the frame or the platform. In this way, the separation between coupling points (which is an important factor in the load/strain transfer function) is unequivocally determined by the geometry of the beams, and is practically insensitive to rocking motion of the coupling members during platform movement.

For applications requiring relatively long beams, the centre portions of the beams are rigidized, at least along a greater part of their length, to avoid excessive deflection thereof under heavy loads. The strain-gauges are attached to both of said intermediate portions of each beam, or else to the flexible outer parts of the middle portion, if the latter is not totally rigidized, and combined to output a signal indicative of the bending moment stressing the rigid centre point.

BRIEF DESCRIPTION OF THE DRAWINGS

FIG. 1 is a tri-dimensional schematic of a weighing machine, of the type addressed by the present invention.

FIG. 2 is an exploded view of the arragement of the mechanical parts according to a first embodiment of the present invention.

FIG. 5 shows a top view of the beams in FIG. 2.

FIG. 4 is a cross-section in the X-Z plane, of the weighing machine in FIG. 2, depicted in a state of finite load.

FIGS. 8A and 8B depict a beam end portion, of the prior art and of the invention respectively, illustrating the origin of the bending moment error, and how this problem is solved in FIG. 8B.

FIGS. 9A and 9B schematically show, according to the prior art and to the invention respectively, the beam end portion and its movement during beam deflection, showing the locus of a coupling point, to teach the origin of the angle error, and how it is reduced in FIG. 9B.

FIGS. 10A, 10B and 10C illustrates features and alternatives of the coupling means that eliminate hysteresis and reduce the effects of the horizontal forces.

FIG. 11 is a cross-section of the beam according to a second embodiment of the present invention.

FIG. 12 is a cross-section of a long beam, according to a particular embodiment of the present invention.

FIG. 13 shows a bending moment diagramme justifying the location of strain-gauge pairs attached to the long beams of FIG. 12.

Figure 5A:
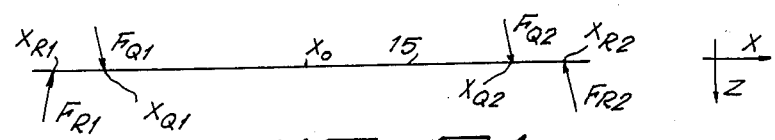
FIG. 5A schematically shows a straight beam to illustrate how horizontal forces may be transmitted by the coupling members.

Making reference to FIG. 1 of the drawings, a weighing machine is shown schematically, including a platform or tray 11, which may move vertically. A force $\overline{Q}$ represents the weight or force exerted by a load at a point 13 of the platform 11. Point 13 could well be located anywhere along tray 11, and in general there will be a multiplicity of forces $\overline{Q}$ distributed on tray 11; however, their effect on the overall weight measurement is simply the summation of their individual effects. Platform 11 is suitably coupled to a pair of horizontal elastic beams 15A, 15B so as to apply four vertical forces $\overline{F}_{Q1}, \overline{F}_{Q2}, \overline{F}_{Q3}, \overline{F}_{Q4}$ at the application or coupling points $X_{Q1}, X_{Q2}, X_{Q3}, X_{Q4}$, respectively. In turn, beams 15A, 15B have four coupling points $X_{R1}, X_{R2}, X_{R3}, X_{R4}$ resting on a base or frame 17 (not illustrated in FIG. 1), to which it is coupled and supported thereby. This resting or supporting action is indicated by reactions $\overline{F}_{R1}, \overline{F}_{R2}, \overline{F}_{R3}, \overline{F}_{R4}$, which react to load forces $\overline{F}_{Q1}, \overline{F}_{Q2}, \overline{F}_{Q3}, \overline{F}_{Q4}$. The coupling rest points $X_R$ on each beam 15 (when generalizing, the subscripts A, B, etc. or 1, 2, etc. are omitted from the reference numerals, e.g. beams 15A, 15B are referred to as 15, etc.) are spaced apart by a distance d. Rest point $X_{R1}$ is separated from supporting point $X_{Q1}$ by distance a, whilst points $X_{R2}, X_{R3}, X_{R4}$ are likewise separated respectively from points $X_{Q2}, X_{Q3}, X_{Q4}$ equal distances a. It can be shown that at a centre point $X_O$ of beam 15, from which rest points $X_R$ are equidistant (and obviously application points $X_Q$ likewise), and bending movement $M_O$ is:

$$M_O = \tfrac{1}{2}(F_{Q1}+F_{Q2})a \qquad (1)$$

which is independent of its relative longitudinal position x on platform 11, for which reason centre point $X_O$ is also known as the invariant point.

Cartesian coordinates are used in the present description to specify axis and directions as illustrated. The X-axis extends in the longitudinal horizontal direction, the Y-axis in the transverse horizontal direction and the Z-axis in the transverse vertical direction, the X-, Y- and Z-axes being mutually orthogonal. Consequently, X-Y is a horizontal plane, X-Z a longitudinal vertical plane, and Y-Z a transverse vertical plane.

According to the preferred embodiment for short beams 15 (to be described in detail further on), strain-gauge units are operatively coupled to beams 15 at their respective invariant or centre point $X_O$, to detect the longitudinal elongation precisely thereat, resulting from bending movement $M_O$.

The already mentioned preferred embodiment will now be described with reference to FIG. 2. The weighing machine comprises a plate, tray or platform 11 and a frame 17; platform 11 is adapted to eventually receive a load Q (FIG. 1) within a desired weight range. A pair of beams 15A, 15B is lodged between frame 17 and platform 11 by two sets 19, 21 of four coupling members 23A, 23B, 23C, 23D, 23E, 23F, 23G, 23H each. The lower set 19 comprises members 23A, 23B, 23G, 23H arranged at the four corners of a quadrangle on frame 21, and the upper set 21 members 23C, 23D, 23E, 23F arranged at the four corners of a quadrangle on platform 11; the latter quadrangle 21 being smaller in the longitudinal direction than the former.

A top (or likewise bottom) view of the beam 15, corresponding to any of beams 15A, 15B is shown in FIG. 3. Beam 15 is made from tempered SAE 1070 steel. Beam 15 is elongated in the direction of longitudinal axis X and comprises two end portions 25A, 25B spaced apart by a pair of intermediate portions 27A, 27B flanking a middle portion 29. Each end portion 25 features an orifice 31 which has two opposite walls or sides which define a pair of straight edges 33, 35 on the under- and topside respectively of beam 15. Both edges 33, 35 are perpendicular to axis X and are spaced apart from one another by distance a, which may be 15 mm in a beam (d=) 220 mm long. It is evident that the uniformity of the value a is critical for each beam 15; acceptable tolerance may be ±0.1 mm for a household machine and ±0.005 mm for a commercial or industrial one. Consequently, both beams 15A, 15B are stamped with the same mold.

The middle portion 29 may be narrower than end portions 25 to enhance flexibility thereof and improve the overall sensitivity of the machine. A pair of strain-guages 37 (only one is visible in FIG. 3) are attached to the very centre $X_O$ (i.e. equidistant from the orifices 31 of end portions 25 of beam 15), to sense longitudinal elongations caused by beam stress in relation to the load on platform 11 (FIG. 3). A special oven-cured epoxy adhesive is used between strain-gauges 37 and beam 15 to assure good mechanical coupling.

Each orifice 31 receives a pair of the coupling members 23, as can be seen with more clarity in FIG. 4. FIG. 4 is a vertical cross-section taken along the longitudinal axis X of one of the beams 15, actually depicted in a state of finite load. The members 23 in FIG. 4 correspond to each one of the members 23A, 23B, 23C, 23D, 23E, 23F, 23G, 23H. Each member 23 of the upper set 21 allows the platform 11 to rest on beam 15 and to transmit a force $\overline{F}_Q$ depending on the position and weight of the load; on the other hand, each member 23 of the lower set 19 provides support for beam 15 and a reaction $\overline{F}_R$ to the forces $\overline{F}_Q$. Members 23 include two plate members 39, 41 each, one plate member 39 being for coupling to the corresponding beam 15 at edges 33, 35 of the latter. The lower 19 members 23 further comprise plate members 41A welded to the frame 17; whilst the upper 21 members 23 further comprise plate members 41B welded to the platform 11.

There are also springs 43 connected between the frame 17 and the platform 11, to avoid the latter becoming accidentally separated from the rest of the machine and to keep the beams 15 in place.

FIG. 4 also shows the positions of the pair of strain-gauges 37A, 37B attached at the very centre $X_O$ of beam 15. In actual fact, the finite length L of the strain-gauge 37 does not affect the measurement, if the strain-gauges 37 extend symmetrically about the centre $X_O$, which obviously must be precisely determined and marked beforehand. The four stain-gauges 37 (two to each beam 15) are connected in a Wheatstone bridge (not illustrated) as known in the art.

Figure 5B:
FIG. 5B, is a magnification of one of the coupling points of the beam of FIG. 5A, showing with more clarity the actual direction of a load force, and how the latter resolves to finite horizontal and vertical components.

The origins of horizontal forces acting on the beams 15, are now explained, with the assistance of FIGS. 5A and 5B to begin with. FIG. 5A schematically shows an X-Z plane containing one of the beams 15 transversely loaded by forces $\overline{F}_{Q1}$, $\overline{F}_{Q2}$, $\overline{F}_{R1}$, $\overline{F}_{R2}$, (in general $\overline{F}$, or $\overline{F}_Q$, $\overline{F}_R$) at respective coupling points $X_{Q1}$, $X_{Q2}$, $X_{R1}$, $X_{R2}$. It is practically impossible for the forces $\overline{F}$ to be purely vertical, due to slight inclinations of the coupling members 23, and also because the latter are subjected to rocking motion during deflection (as explained further on) unless they are perfectly rigid. Consequently the forces $\overline{F}$ are in actual fact generally inclined in the X-Z plane with respect to the Z-direction, as illustrated in FIG. 5B.

This figure shows a magnification of the action of a force $\overline{F}$ on the beam 15 at coupling point $X_Q$ (this is also applicable to rest points $X_R$). Due to the inclination of $\overline{F}$, the latter resolves into a vertical component $\overline{F}_V$ and a horizontal component $\overline{F}_H$. The vertical component $\overline{F}_V$ is the true contribution of the weight Q of the load on the platform 11. Because $$\beta \approx 90° \rightarrow |F_V| \simeq |F|,$$

no distinction is generally made herein between $\overline{F}$ and $\overline{F}_V$. The horizontal component or force $\overline{F}_H$ is not determined univocally, at least not directly, by the load $\overline{Q}$, and is thus a disturbing factor. It can be easily realized that its magnitude is given by:

$$|F_H| = |F| \tan \beta \tag{2}$$

All the forces $\overline{F}$, whether load forces $\overline{F}_Q$ applied to points $X_Q$ or reactions $\overline{F}_R$ applied to points $X_R$, resolve to horizontal components $\overline{F}_H$ all of which generate error moments as is explained more fully later on, and to true vertical components $\overline{F}_V$.

Figure 6A:
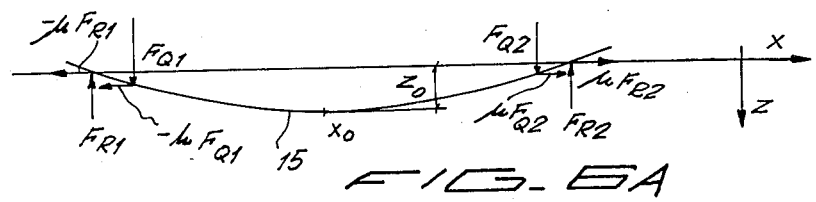
FIGS. 6A and 6B respectively show how friction forces are generated in operation, to illustrate why hysteresis is originated due to their dependency on beam deflection direction.
Figure 6B:
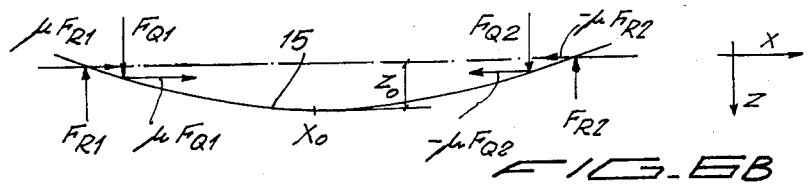

Further contributions to the horizontal forces $\overline{F}_H$ are made by friction and/or elastic forces, due to deflection of the beam 15, because the beam 15 shortens in the longitudinal direction X. A second origin of the horizontal forces $\overline{F}_H$ is friction between the beams 15 and the coupling members 23 during deflection of the former, as depicted in FIGS. 6A and 6B. Both these figures show friction forces $\mu \overline{F}_{Q1}$, $\mu \overline{F}_{Q2}$, $\mu \overline{F}_{R1}$, $\mu \overline{F}_{R2}$ due to relative sliding movement between the beams 15 and the coupling members 23. It may be appreciated that this relative sliding movement is generally horizontal so that the friction forces $\mu \overline{F}$ may be considered as horizontal forces $\overline{F}_H$, and, furthermore, that the friction action increases with the rigidity of the coupling members 23.

Furthermore, the orientation of the friction forces $\mu F$ depends on the direction in which the beam 15 is moving vertically, i.e.

$$F_H = \pm \mu F$$

because when the vertical movement of the beam 15 changes direction, the beam 15 slides the other way along the face of the coupling members 23. In this regard, FIG. 6A shows the friction force vectors $\mu \overline{F}$ when the beam 15 is moving downwards (speed $\dot{z} > 0$), and FIG. 6B when it is moving upwards ($\dot{z} < 0$). As a consequence of the change of direction of the friction forces $\mu \overline{F}$, the deflection $z_O$ at centre $X_O$ of the beam 15 for a given load $\overline{Q}$ differs for upscale and downscale measurements. As it is necessary for the beams 15 to be elastic in the vertical Z-direction, the loaded beams 15 will oscillate (i.e. descend and ascend alternatively), and successively invert the direction of the friction forces uF before settling in its stable state, for which reason the output signal will be subjected to hysteresis.

The coupling members 23 can be made sufficiently flexible so that the friction forces $\mu\bar{F}$ generate elastic displacements without the beams 15 sliding along the coupling members 23. In this case, the hysteresis disappears because, although horizontal forces $\bar{F}_H$ remain, they do not suffer the orientation inversion of the friction forces $\mu\bar{F}$, shown in FIGS. 6A and 6B.

Figure 7:
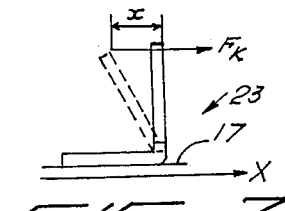
FIG. 7 schematically illustrates a side view of the body of one of the coupling means which is allowed to yield elastically with deflection, the effect of which substitutes elastic forces in place of friction forces, thereby eliminating hysteresis.

FIG. 7 shows any one of the coupling members 23, made to yield with beam motion, i.e. it behaves like a spring having a constant K which is relatively low, bearing in mind the friction coefficient $\mu$ at the coupling points $X_Q$, $X_R$. When the beams 15 deflect, the coupling member 23 will yield a distance x in the longitudinal direction and oppose a horizontal elasticity force $\bar{F}_K$ having a magnitude of $$F_K = K \cdot x \tag{3}$$

FIG. 8A illustrates an end portion 25' of a prior art beam 15' (see Argentine Pat. No. 216,822) to show how these horizontal force components $\bar{F}_H$ produce an error moment $M_H$. For ease of comparativeness, like reference numerals and variable symbols are used to state both the prior arts and the inventions cases, distinguished by a prime symbol (') suffixed in the prior art's case.

FIG. 8A shows load and reactive forces $\bar{F}_Q$, $\bar{F}_R$ applied at respective application points $X_Q$, $X_R$ located at a beam end portion 25'. The application points $X_Q$, $X_R$ correspond naturally to the coupling edges 33, 35, in the beams 15. When describing the physical structure of the beams 15, the exact term "edges" is used; however, when explaining a principle, the term "points" is preferred herein for illustrativeness. According to what has been explained beforehand, corresponding horizontal forces $\bar{F}_{HQ}$, $\bar{F}_{HR}$, develop at each coupling point $X_Q$, $X_R$ which, due to the position of the latter, and the finite thickness h of the beams 15 are vertically offset the distance $z_H = h$.

Consequently, the pair of forces $\bar{F}_H$ produce an error moment $M_H$ which is algebraically added to the bending moment M of the beam 15. Specifically, each elementary horizontal force $\bar{F}_H$ contributes an error factor of $$M_H = \tfrac{1}{2} F_H \cdot z_H = \tag{4}$$

$$M_H = \tfrac{1}{2} F_H \cdot h \tag{4'}$$

to the bending moment $M_O$ picked up by the strain-gauges 37.

Before detailing how the present invention overcomes the horizontal forces problem, the distorting variation of the load weight/bending moment $Q/M_O$ transfer function is described with the assistance of FIG. 9A. This figure shows the prior art beam 15' in its unloaded state (identified by suffix a of reference numeral 15'a), and the same beam 15 is shown in dashed line 15'b positioned in a finite loaded state (likewise, identified by suffix b), which for argument's sake may be considered corresponding to a state of nominal, of mean, or of maximum load. Let the reactive application point $X_R$ be a fixed reference point, in which case the load application point $X_Q$ will move from its initial position at $X_{Qa}$ to loaded position at $X_{Qa}$ along an arch 45 of a circumference of radius m. The factor a in the transfer function $M_O/F$ (see eq. 1) is the longitudinal component of the constant distance m between application points $X_Q$, $X_R$. Because the prior art beam 15' is straight and flat, the distance vector m is inclined, forming an angle $\alpha'$ with the vertical. While the value m is practically constant, its horizontal projection $a + \Delta a$ varies with beam flexure, generating the following angle error in the transfer function:

$$\frac{\Delta a'}{a'} = \frac{\sin(\alpha' + \Delta\alpha) - \sin\alpha'}{\sin\alpha'} \tag{5}$$

Returning to the embodiment of FIGS. 2, 3 and 4, according to the present invention, the end and intermediate portions 25, 27 are longitudinally inclined, permanently bent into a V-shaped profile, so that the edges 33, 35 of the orifice 31 which connect with the coupling members 23 lie in a single (for each beam generally) horizontal plane XY. Because the different bendings of the beam 15 at different loads tend to offset the edges 33, 35 from this plane, an initial offset (not illustrated in these FIGS. 2, 3 and 4) is provided when the machine is unloaded, so that the edges 33, 35 become coplanar under some desired or finite load (as depicted in FIG. 4).

The alignment of the application points $X_Q$, $X_R$ (FIG. 1) of the load and reactive forces $\bar{F}_Q$, $\bar{F}_R$ along a single horizontal axis or plane, according to the present invention, contributes to considerably improve the precision of the weight measurement.

FIG. 9B shows the situation in the case of the present invention in the same way FIG. 9A shows the prior art situation. The coupling edges 33, 35 of beam 15 are separated a segment of length m which is arranged to be substantially horizontal for a given loaded state, i.e. forming an angle $\alpha = 90°$ with the vertical, due to the V-shape ends of the beams 15. Thus evidently $$a = m = \text{constant for } \alpha = 90° \tag{6}$$

The above expression (6) forms the principle by which the angle error is eliminated to give a constant transfer function. Mathematically, using eq. (5) and substituting $\alpha'$ for $\alpha$ to calculate the right hand side, one of the improvement results of the present invention is:

$$\left.\frac{\Delta a'}{a'}\right|_{\alpha'} >> \left.\frac{\Delta a}{a}\right|_\alpha \tag{7}$$

for a given $\Delta\alpha$. For example, the following data set: $\alpha' = 45°$, $\alpha = 90°$, $\Delta\alpha = 1°$ gives $\Delta a'/a' = 173 \times 10^{-4}$ and $\Delta a/a = 152 \times 10^{-6}$, finally resulting that the angle error improves 114 times.

In any case, it is patently evident from FIGS. 9A and 9B that $\Delta a << \Delta a'$. In both these figs., the Z-direction is magnified in relation to the X direction, for the sake of making a clearer picture. The improved angle error can be justified by looking at FIG. 9B, where, if point $X_R$ is the fixed reference, then point $X_Q$ pivots around it an angle $\Delta\alpha$ during deflection, from $X_{Qa}$ to $X_{Qb}$. If $\alpha = 90°$, the infinitesimal locus arch described by point $X_Q$ is vertical, leaving the horizontal component a unchanged.

The improvement of the present invention on the moment error can be seen in FIG. 8B. Due to the inclination of the end portion 25, the pair of horizontal forces $\overline{F}_{HQ}$, $\overline{F}_{HR}$ are now aligned, which annuls the distance factor $z_H$ and makes the error moment in eq. (4) tend to zero, i.e. for a finite non-zero thickness h:

$$M_H = \tfrac{1}{2} F_H z_H \Big|_{z_H = 0} = 0 \qquad (4'')$$

Consequently, the bending moment $M_O$ detected by the strain gauges 37 depends on only one type of variable, this being the true vertical forces $\overline{F}_V$, dependent on the load $\overline{Q}$.

Naturally, the moment error cannot be zero for any load state, because the beam 15 must deflect under different loads bending moments M to produce distinguishable strain variations picked-up by the sensing means 47. In reality, the coupling points $X_Q$, $X_R$ will only be aligned for just one specific load state. It is preferable that the latter does not correspond to the unloaded (Q=0) state, but rather to some desired finite (i.e. non-zero) state, which may correspond to a nominal, a mean, or a maximum load $Q_M$.

Figure 8C:
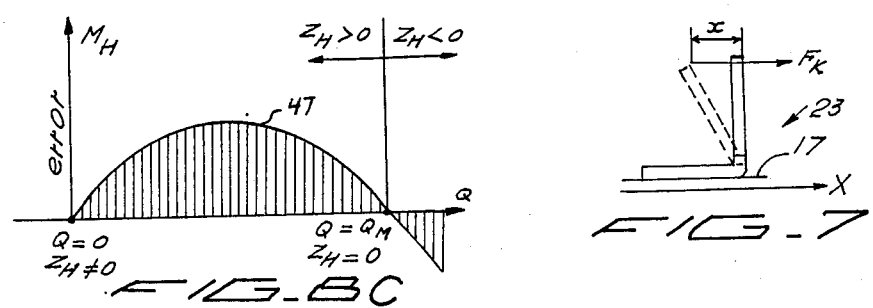
FIG. 8C is a graph of error moment $M_H$ as a function of load Q.
Figure 8D:
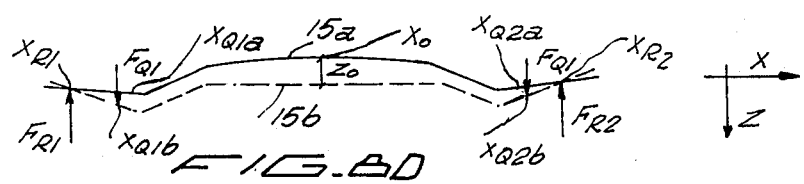
FIG. 8D shows the initial dome shape of the beam of FIG. 4 when unloaded.

The graph in FIG. 8C shows how the error moment $M_H$ in eq. (4'') varies with different states, depending on the instant value of the horizontal forces $\overline{F}_H$ and their offset $z_H$. The curve 47 shows that the best solution is to select a nil offset ($Z_H=0$) to coincide with a usual finite load $Q_M$. The schematical FIG. 8D shows how the beam 15 of the present invention has an initial slightly domed configuration 15a when unloaded (Q=0); the dashed line shows the configuration of the beam 15b when the platform 11 is subjected to the finite load $Q_M$ and the centre $X_O$ suffers a vertical deflection $z_O$. If, on the contrary, a zero offset ($z_H=0$) were assigned to a loaded state, then the function 47 would curve upwards and the error moment $M_H$ would increase monotonously.

It will be appreciated that horizontal elastic forces $\overline{F}_K$ are preferred to friction forces $\mu\overline{F}$, because the former are proportional (albeit non-linearly and, consequently, somewhat load eccentricity dependent) to the load, whilst the latter induce hysteresis. FIGS. 10A and 10B show two alternative embodiments for member 23, which are similar in concept but differ in the means used to lower their spring constant K to minimize $\overline{F}_K$, thus minimizing non-linearity and eccentricity dependency in $M_O$. FIG. 10C is a vertical cross-section of either embodiments of FIGS. 10A and 10B.

As already mentioned, the member 23 includes two plate members 39, 41 joined to each other. The plate member 41 is a common plate of iron SAE 1010 bent into an L-shape to form a base portion 49 and a side portion 51. The base portion 49 is welded to either the frame 17 or platform 11 as the case may be. In FIG. 8A, the side portion 51 may rock in a small arch, in the direction indicated by the arrow A. In FIG. 8B, an oblong slot 53B is made to facilitate rocking or bending of portion 51 around slot 53B. Thus, upon flexion of the beam 15, (FIG. 4), member 23 rocks to accompany the beam 15 so that friction forces $\mu F$ are replaced by elastic forces $\overline{F}_K$ which may be lower magnitude-wise. Typically, displacement x (FIG. 7) is about 0.01 mm.

The member 39 is also a plate member, adapted to receive the side portion 51 of the L-shaped member 41 in a transverse portion. The shape of member 39 is adapted to penetrate orifice 31 (FIG. 4), and it defines a horizontal face 55 for contact with one coupling edge 33, 35 of orifice 31. The member 39 is made from SAE 1070 steel and is then tempered to ensure hardness.

In FIG. 4 it is shown how the beam 15 is coupled to each plate 39, so that edge 33 (or 35, as the case may be) pivots on the face 55. With this arrangement, members 23 will yield during flexion of the beam 15, and practically the only forces that will be transmitted are the load and reaction forces $\overline{F}_Q$ and $\overline{F}_R$. Edges 33 and 35 in FIG. 4 respectively identify points $X_R$ and $X_Q$ in FIG. 1. The arrangement of FIG. 4 is symmetrical in respect to the X axis at $X_O$, therefore portion 25B is similar to portion 25A.

In an alternative embodiment shown in FIG. 11, beam 15 is straight, and substantially flat including straight end portions 57A, 57B traversed by the coupling orifices 59A, 59B which are step-shaped to provide coupling edges 33, 35. In this embodiment, the coupling face 55 of the coupling member 39 need be inclined, to provide an edge-and-face type coupling (i.e. an edge-on-face contact between beam 15 and a lower member 23 from coupling set 19; or a face-on-edge contact between beam 15 and an upper member 23 from coupling set 21.

The edge-and-face coupling is another interesting feature of the invention, and it consists basically of an edge 33, 35 supporting or resting on (i.e. coupled to) a face 55, as seen in the embodiments of FIGS. 4 and 11. This type of coupling differs greatly from the hinge type disclosed in U.S. Pat. No. 2,899,191, and its best advantages lie in its simplicity of construction, and in the fact that the distance a is directly determined by the longitudinal dimension of the orifices 31. Thus, no special precautions and adjustments are necessary when fixing the base plates 49 of the coupling members 23 to the frame 17 and to the platform 11. Furthermore, no extra means are needed to avoid longitudinal displacement of the tray 11, which otherwise could cause a shortening of distance a at one end 25 and a lengthening at the opposite end 25 of beam 15. Argentine Pat. No. 216,822 discloses an edge-and-edge type coupling with which the edge-and-face coupling of the present invention compares favourably. Apart from requiring precise positions and mounting of the coupling members with respect to the frame and the tray, the prior art edge-on-edge coupling causes one edge to roll along the other during beam motion, because both edges (one convex and the other concave) have similar small curvature radii, thus introducing additional friction and, more important, modifying the distance a between the load and reactive force application points. As stated before, this distorts the final weight measurement. In U.S. Pat. No. 2,899,191, the connections between beam and frame define face-on-edge couplings, however, because the face is integral with the beam and the edge with the coupling means, the beam may slide longitudinally with respect to the frame, causing the a factor to vary. In the present invention, on the other hand, the a factor can hardly vary, due to the considerable difference in curvatures between edge 33, 35 and face 55, and that it is insensitive to beam sliding because the value of a is inherently determined solely by the geometry of the beam 15, due to that the edge part of the coupling is integral with the beam 15, rather than with the member 23.

The weiging machine according to preceding embodiments give excellent results with beams 15 up to 40 cm long. For longer beams, the measurement precision is masked by the excessive deflection of beams over about 60 cm long. It may be appreciated that the excessive deflection of the centre of the beams 15 magnifies the errors which the present invention attemps to reduce. Furthermore, at greater deflections, the arc A (FIG. 10) is consequently greater, getting out of hand in practice, because the side portion 51 rocks further away from its optimum elasticity (i.e. vertical) position. A further object of the present invention is to reduce the centre-point deflection $z_O$ of long beams with the embodiment shown in FIG. 12. As is already known in the art, a load $\bar{F}$ produces a displacement $z_O$ in the centre $X_O$ of the beam 15 proportional to the square of the beam length d, according to the following expression:

$$z_0 = \frac{Fd^2a}{8EI}\left(1 - \frac{4a^2}{3d^2}\right) \approx \frac{Fd^2a}{8EI} \quad (7)$$

where I is the moment of inertia and E the longitudinal elasticity of Young's modulus.

In accordance with the present invention, the beam 15 has a middle portion 61 considerably more rigid than the middle portion 29 of the beam 15 in FIG. 4 which is vertically elastic along its entire length d. It is desirable that the neutral axis n of this portion be contained in the same horizontal plane in which the coupling edges 33, 35 lie, especially when the weighing machine is loaded. To this end, at least most of the length of the middle portion 61 is comprised by a central rigid member 63 flanked by a pair of flexible intermediate portions 27A, 27B which separate the former from the corresponding end portions 25A, 25B.

A pair of profiles 65A, 65B are fixed to or integrated on each of the top and bottom faces 67, 69 of the beam 15. Thus, the denominator of the preceding equation (7) may be increased practically without limits, as the greater rigidness of the central portion 61 increases the inertia moment I. In the prototype illustrated in FIG. 12, the moment of inertia I of the central portion 63 was increased one hundredfold. The profile 65 includes a flange 71 which may be either soldered to the faces 67, 69 of the beam 15, or else bolted or riveted thereto. The profile 65 further includes a vertical web 73, which, being perpendicular to the beam 15, rigidizes portion 63.

The most outer parts 75A, 75B of the horizontal middle portion 65 abut longitudinally from the rigid portion 63, and are flexible to allow the strain-gauges 37 to be operatively attached thereto. Preferably, two strain-gauges 37 are used for each beam 15, one strain-gauge 37A being fixed to the upper face 67 of one of the flexible parts 75A of the beam 15, whilst the second strain-gauge 37B is fixed to the underface 69 of the opposite flexible part 75B, so that the first strain-gauge 37A detects compressive strain and the other strain-gauge 37B tensile strain.

The strain-gauge connecting areas $X_{SA}$, $X_{SB}$ must be precisely predetermined. Referring to FIG. 13, it will be shown that there must be an exact left-right symmetry with respect to a central transverse plane (not illustrated). FIG. 13 shows a diagramme of bending moments along the longitudinal axis X of the beams 15. Between the inner coupling points $X_Q$, the moment $M_x$ follows the lineal function:

$$M_x = R_1 \cdot x - F_1 \cdot (x-a) \quad (8)$$

The moment $M_O$ at the centre or invariant point $X_O$ is constant for a given load Q, for which reason it can be seen that if the straight-gauge 37 connection points $X_{SA}$, $X_{SB}$ are symmetrical about $X_O$, then the sum of the respective bending moments $M_A + M_B$ at connecting points $X_{SA}$, $X_{SB}$ is always twice $M_O$ (in FIG. 13, $+M_A = -M_B$), so the detected $M_A + M_B$ is also independent of the longitudinal eccentricity of the load Q (FIG. 1).

Consequently, Q may be measured by taking bending moments $M_x$ at symmetrical points $X_{SA}, X_{SB}$ about centre $X_O$. That is, in the same way as the coupling edges 33, 35 must be equally spaced at a distance a in both end portions 25, both mechanical connecting points $X_S$ must be separated an identical distance l from its nearest orifice 31. Alternatively, the rigid portion 63 may span the whole length of the central portion, in which case the strain-gauges 37 may be attached to the flexible intermediate portions 27.

Although the essential features of the invention have been brought out by means of a preferred embodiment, the invention is not limited to this embodiment and, on the contrary, extends to all alternative forms within the purview of the appended claims.

I claim:

1. A weighing machine for precise measurement of the weight of a load and including a pair of side-by-side vertically elastic beams having respective longitudinal axes extending in substantially horizontal directions, each beam having two end portions and a middle portion therebetween; means coupled to each of said end portions for transverse loading the end portions at application points thereof in response to said load, to produce a bending moment in each beam at a predetermined point of the middle portion thereof, the magnitude of said bending moment being dependent on said weight and substantially independent of the horizontal position of said load relative to the beams; and means for detecting bending moments at said predetermined point of each beam and for deriving the magnitude of said weight; the improvement wherein said end portions are longitudinally inclined with respect to said horizontal plane to substantially align all said application points of said transverse loading on each beam along a horizontal plane, thereby considerably reducing errors due to horizontal forces transmitted by said application points and to longitudinal displacements of the application points within a working range of weight values of said load.

2. The weighing machine of claim 1, wherein said detecting means comprises strain-gauge units attached to the top or underface or both faces of each beam, substantially at said predetermined point thereof.

3. The weighing machine of claim 1, wherein said transverse loading means comprise respective pairs of face-on-edge or edge-on-face contacts, the edges forming an integral part of the beams and the corresponding faces applying load or reactive forces thereto, said faces extending in a generally horizontal plane and said edges extending in a horizontal direction perpendicular to the beam longitudinal direction.

4. The weighing machine of claim 1, wherein said end portions are inclined at an angle between 10° and 60° with respect to said horizontal plane.

5. The weighing machine of claim 4, wherein said angle is approximately 15°.

6. The weighing machine of claim 1, wherein each beam is further shaped so that the neutral axis of the beam at the position of said predetermined point lies substantially in said horizontal plane.

7. The weighing machine of claim 6, wherein said middle portion of each beam is generally horizontal, whilst the ends of each beam are permanently bent to each form a V or inverted-V cross-section: one side of each V forming a respective end portion, and the other side of each V forming a respective intermediate portion between each end portion and the middle portion of each beam.

8. An elongated beam for use in detecting magnitudes of forces or moments, such as in a weighing machine or other type of dynamometer machine; said beam having two end portions adapted to be transversely loaded by said forces or moments to produce bending moments in said beam, and a middle portion containing a central section where the bending moment is dependent on the summatory of said magnitudes but is insensitive to the relative proportions of said magnitudes; the improvement whereby said end portions are inclined with respect to the plane of said middle portion, so that all said forces or forces resulting from said moments to be detected are applied thereto at application points thereof lying substantially in a single plane parallel to said middle portion.

9. The beam of claim 8, wherein all said application points lie in said single plane when said beam is subjected to a finite transverse load state.

10. The beam of claim 8, wherein the longitudinal cross-sections of each of said end portions are V-shaped.

11. The beam of claim 8, wherein at least part of said middle portion is vertically rigid against transverse forces.

12. The beam of claim 8, wherein the neutral axis thereof along said middle portion lies substantially in said single plane.

13. A weighing machine for precise measurement of the weight of a load and including a pair of side-by-side vertically bending beams having respective longitudinal axes extending in substantially horizontal directions, each beam having two end portions and a middle portion therebetween; means coupled to each of said end portions at application points thereof for transverse loading each beam in response to said load and thereby produce a bending moment therein having a magnitude at a central transverse plane of the middle portion thereof dependent on said weight and substantially independent of the horizontal position of said load; and strain-gauge units operatively attached to flexible parts of each beam for detecting said magnitude of the bending moment to derive said weight; the improvement wherein in each beam said middle portion includes means for enhancing rigidity along a considerable length thereof to reduce vertical deflection particularly at said central plane thereof; and said strain-gauge units are symmetrically spaced apart from said central plane of the corresponding beam so that they are located at flexible outer parts longitudinally equidistant therefrom, whereby each strain-gauge is responsive to deformation caused by a bending moment of $M = R \cdot l - F \cdot (l - a)$, where 'R' and 'F' are the magnitudes of a pair of forces applied by said transverse loading means at the nearest end portion, 'l' is the distance between each flexible part and the nearest end portion 'a' is the distance between said pair of forces, such that the sum of said bending moments is substantially independent of eventual eccentricity of said load.

14. The weighing machine of claim 13, wherein said end portions are longitudinally inclined with respect to said horizontal plane to align said application points along a horizontal plane parallel to said middle portion.

15. The weighing machine of claim 13, wherein said rigidity enhancing means comprise considerably increasing the vertical dimension of the cross-section of each beam, except at said flexible parts where said strain-gauge units are attached to the beam.

16. The weighing machine of claim 15, wherein said vertical dimension is increased by fixing structural members to the top or underface or both horizontal faces of each beam, each of said structural members having at least one substantially vertical web.

17. A dynamometer machine for detecting the force magnitude of a load applied thereto, and including a pair of longitudinally elongated beams that bend under the effect of said load, each beam including a pair of end portions having application points for receiving transverse forces arising from said load, a middle portion extending between said pair of end portions, and means for measuring a parameter related to the bending moments of said beams to derive said force magnitude therefrom; wherein said end portions are inclined in relation to said middle portion so that said application points substantially lie in a common plane parallel to the beam longitudinal direction, at least for some nominal value of said force magnitude.

* * * * *